United States Patent
Perego et al.

(10) Patent No.: US 8,372,255 B2
(45) Date of Patent: Feb. 12, 2013

(54) ELASTIC CURRENT COLLECTOR FOR ELECTROCHEMICAL CELLS

(75) Inventors: Michele Perego, Milan (IT); Leonello Carrettin, Milan (IT); Dario Oldani, Milan (IT); Angelo Ottaviani, Milan (IT)

(73) Assignee: Uhdenora S.p.A., Milan (IT)

( * ) Notice: Subject to any disclaimer, the term of this patent is extended or adjusted under 35 U.S.C. 154(b) by 437 days.

(21) Appl. No.: 12/452,107

(22) PCT Filed: Jul. 8, 2008

(86) PCT No.: PCT/EP2008/058847
§ 371 (c)(1),
(2), (4) Date: Dec. 14, 2009

(87) PCT Pub. No.: WO2009/007366
PCT Pub. Date: Jan. 15, 2009

(65) Prior Publication Data
US 2010/0108537 A1     May 6, 2010

(30) Foreign Application Priority Data

Jul. 10, 2007 (IT) .............................. MI2007A1375

(51) Int. Cl.
*C25B 9/04* (2006.01)
*H01M 4/64* (2006.01)
*H01M 4/70* (2006.01)
*H01M 4/72* (2006.01)
*H01M 4/74* (2006.01)
*H01M 4/75* (2006.01)

(52) U.S. Cl. ............... 204/288.2; 204/288.3; 204/286.1; 204/279; 429/517; 429/522; 429/519; 429/532; 429/241; 429/242

(58) Field of Classification Search .................. 204/279, 204/286.1, 288.2, 288.3; 429/517, 519, 522, 429/532, 241, 242, 245
See application file for complete search history.

(56) References Cited

U.S. PATENT DOCUMENTS

| 4,526,663 A | * | 7/1985 | Yoshida et al. | ............... 205/525 |
| 7,323,090 B2 | * | 1/2008 | Houda et al. | .................... 204/254 |
| 2004/0101742 A1 | * | 5/2004 | Simpkins et al. | ............... 429/44 |
| 2004/0188245 A1 | * | 9/2004 | Katayama et al. | ............ 204/252 |
| 2004/0253519 A1 | * | 12/2004 | Oldani et al. | ................. 429/238 |

* cited by examiner

*Primary Examiner* — Bruce Bell
(74) *Attorney, Agent, or Firm* — Eschweiler & Associates, LLC

(57) ABSTRACT

The invention relates to a current collector for electrochemical diaphragm or membrane-type cells, comprising a layer obtained by interlacing or weaving of a multiplicity of first sets of metal wires with a multiplicity of single metal wires or of second sets of metal wires and provided with substantially parallel corrugations. Such layer is coupled to a planar element consisting of a cloth or a flattened stocking formed by weaving of a single metal wire. The current collector is characterised by a low angular coefficient of the pressure/thickness ratio over a wide range of compression levels.

19 Claims, 3 Drawing Sheets

ELASTIC CURRENT COLLECTOR FOR ELECTROCHEMICAL CELLS

This application is a 371 of PCT/EP2008/058847 filed Jul. 8, 2008.

FIELD OF THE INVENTION

The present invention relates to an electrically conductive elastic current collector, useful in electrolysis cells, in particular diaphragm or ion-exchange membrane-type electrolysis cells provided with an anode and a cathode in intimate contact with the diaphragm or membrane.

BACKGROUND OF THE INVENTION

Electrolysis cells subdivided by a diaphragm into two electrode compartments are frequently used in electrochemical processes; a common feature of such cells is the need of keeping one electrode in contact with the separator, while the other electrode acts as a rigid support for the separator itself. In the specific case in which the separator is a diaphragm or an ion-exchange membrane, the above cell design is widely applied in chlor-alkali electrolysis, which is known to represent one of the few electrochemical processes of widespread industrial application. In the case of the chlor-alkali process, the most common design provides the anodic compartment to contain a rigid anode consisting of a titanium punched sheet or expanded sheet or mesh coated with a superficial electrocatalytic film for chlorine evolution comprising noble metal oxides; this compartment is fed with a concentrated solution of an alkali chloride, usually sodium chloride.

The structure of the cathodic compartment may encompass different types of mechanical arrangement.

In the version described for instance in U.S. Pat. No. 5,225,060 the cathodic compartment, fed with a caustic soda solution, contains a rigid cathode consisting of a nickel punched sheet or expanded sheet or mesh, optionally provided with an electrocatalytic film for hydrogen evolution. An ion-exchange membrane is installed between the anode and the cathode and being the pressure in the cathodic compartment normally higher than in the anodic compartment, the membrane is pushed by pressure differential against the anode. Since both the anode and the cathode consist of rigid parallel planar structures, it is necessary to maintain a certain gap between the two facing surfaces in order to avoid that the inescapable deviations from the ideal parallelism bring the anode and cathode surfaces in simultaneous contact with the membrane: in such conditions, the contact pressure would not be controllable and the membrane could be heavily damaged. The need of maintaining a certain gap between the anodic and the cathodic surface, indicatively of 2-3 mm, entails a cell voltage penalty associated with the ohmic drop generated by the electric current crossing the liquid phase between cathode and membrane: since cell voltage is directly proportional to energy consumption per unit weight of product chlorine or caustic soda, it follows that the overall process economics are sensibly disfavoured.

To overcome this inconvenient, membrane chlor-alkali cell design was improved in time giving rise to the development of cathodic structures capable of bringing the cathode surface in contact with the membrane under moderate and predefined contact pressures.

A first family of cells, disclosed for instance in U.S. Pat. No. 5,254,233 and U.S. Pat. No. 5,360,526, provides the cathode in form of punched sheet or expanded sheet or mesh to be secured to elastic supports consisting of springs of various design, fixed in their turn to a planar current distributor or directly to a cell wall: the springs, upon assembling the cell, compress the cathode against the membrane at a pressure only dependent on their elastic behaviour and on the deviations from the anode-to-current distributor or anode-to-cell-wall distance associated with the construction tolerances. The drawback of this constructive solution is given by the fact that the sheet or mesh must present a certain stiffness in order to allow springs working in a correct fashion: it follows that the uniformity of cathode-membrane contact requires a perfect planarity of both surfaces, of the membrane-supporting anode and of the cathode pressed against the membrane by the springs. Such planarity is not reasonably obtainable with big sized anodes and cathodes suitable for being installed in cells of high productive capacity normally employed in modern industrial plants. Hence, even though the cathode surface is brought into contact with the membrane surface, there still exist areas in which the two surfaces remain spaced apart, with the consequence of an inhomogeneous current distribution and of an energy consumption above the expected values.

A second family of cells, disclosed for instance in U.S. Pat. No. 4,444,632 and U.S. Pat. No. 5,599,430, is directed to overcome the inconveniences associated with the stiffness of the cathodic sheet or mesh of U.S. Pat. No. 5,254,233 and U.S. Pat. No. 5,360,526 by utilising as the cathode a thin punched sheet or expanded sheet or mesh provided with high flexibility and therefore highly adaptable when pressed against the surface of the anode-supported membrane, even when the rigid anode presents a non perfectly planar surface profile. The highly flexible structure of the cathode entails as a first consequence that springs disclosed in U.S. Pat. No. 5,254,233 and U.S. Pat. No. 5,360,526 can't be usefully employed anymore since their mechanical action would not be uniformly transferred to the whole cathodic surface. For this reason, in the cited documents there is disclosed the use of planar elastic layers, somehow acting as distributed springs. These layers consist of planar elements formed by weaving of nickel wires and subsequently corrugated: such elements are juxtaposed in a number of at least two to form elastic structures, preferably with crossed corrugations so as to minimise interpenetration, and may be enclosed between two further cloths of planar wires. One alternative construction provides the planar layer to consist of at least two juxtaposed elements formed by interconnected coils of wire. In known cell designs the above disclosed elastic layers form part of a cathodic package normally comprising a rigid current distributor made of a nickel punched sheet or expanded sheet or mesh of adequate thickness, the elastic layer and a thin and highly flexible nickel punched sheet or expanded sheet or mesh optionally provided with an electrocatalytic film for hydrogen evolution. Upon assembling the cell by joining the anodic and the cathodic compartment, such elastic layer is partially compressed, thereby transferring a pressure to the thin and flexible cathode which in its turn is pressed against the rigid anode-supported membrane: since the elastic layer contacts the cathode in a multiplicity of points, the compression exerted on the membrane is substantially distributed and moreover the cathode flexibility ensures that the latter is completely adapted to the membrane profile. The aim of this rather complex layered structure is to ensure an elastic behaviour characterised by linearity and by a modest angular coefficient of the relationship of the pressure exerted in a partially compressed state to the corresponding compression: such features are required since only in this way it is possible to ensure a good homogeneity of cathode-to-membrane pressure at moderate values, so that integrity of the membrane is preserved. Nevertheless, this objective is only partially achieved with the above elastic structures, essentially due to the impossibility of completely avoiding interpenetration between the various wire elements, with the consequence of an inevitable local variability of pressure exerted on the cathode-membrane assembly, attaining peak levels that can impair a correct preservation of the membrane. Furthermore, structures of such a complexity bear high production costs and a difficulty of installation scarcely compatible with the economics of an industrial process. These inconveniences are only partially overcome by the teaching of WO 03/048422, wherein corrugated planar elements juxtaposed with crossed corrugations are enclosed in a flattened stocking-type structure made of woven wires: the stocking containing the two corrugated elements in its interior constitutes in fact an easier assembly to handle and install in the cell. However, the problems of high cost and of a higher than desirable angular coefficient of the pressure to compression relationship remain unsolved.

The above prior art analysis shows the need of developing an elastic current collector suitable for being installed in an electrolysis cell characterised by a modest angular coefficient of the pressure to compression relationship over a wide range of compression values, by simplicity of installation and by a moderate cost.

SUMMARY OF THE INVENTION

Various aspects of the invention are set out in the accompanying claims.

In one embodiment, the present invention relates to an elastic current collector consisting of an assembly comprising an element formed by a cloth obtained by interlacing or weaving of a multiplicity of first sets of metal wires with a multiplicity of single metal wires or of second sets of metal wires, and subsequently corrugated with formation of substantially parallel corrugations, such element being further coupled to at least one planar cloth or flattened stocking obtained by weaving of a single wire.

In another embodiment, the invention relates to an electrolysis cell containing the elastic collector as hereinbefore defined.

In another embodiment, the invention relates to the use of the electrolysis cell comprising the elastic collector as hereinbefore defined in a chlor-alkali electrolysis process.

DETAILED DESCRIPTION OF THE DRAWINGS

Figure 1:
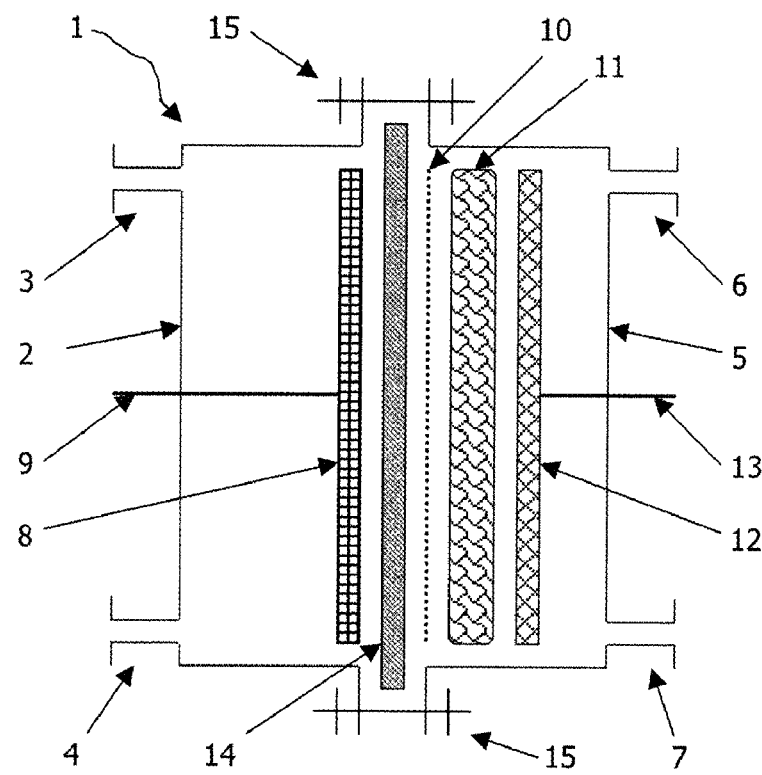
FIG. 1 is a side-view of an electrolysis cell incorporating an elastic current collector.

FIG. 1 illustrates an electrolysis cell suitable for accommodating an elastic current collector. The cell is indicated with 1 and comprises two shells 2 and 5 which can be reciprocally fastened by tightening means, for instance a set of bolts 15, and arranged to enclose a separator 14, for instance consisting of a diaphragm or ion-exchange membrane. Shell 2 contains a rigid electrode 8 consisting of a rigid planar surface provided with openings; in one embodiment, the rigid electrode 8 consists of at least one component selected from the group of punched sheets, expanded sheets and meshes of interlaced wires and is coupled to a current conductor 9 suitable for being connected to one pole of an external rectifier, not shown. Shell 2 is also provided with nozzles 4 and 3, respectively for feeding the solution to be electrolysed and for extracting the exhaust electrolytic solution mixed with the optional gases formed on electrode 8 during operation: in one embodiment, electrode 8 supports separator 14 which comes in contact therewith upon fastening bolts 15 and optionally under the effect of a pressure differential established between the two compartments. Shell 5 comprises an electrodic package which, in one embodiment, is comprised of a rigid current collector 12 and a flexible electrode 10 with an elastic collector 11 in a partially compressed state arranged therebetween. Upon tightening bolts 15, the action exerted by the elastic collector on the two opposed surfaces of the rigid current distributor and of the flexible electrode presses the latter against separator 14 supported by electrode 8. The rigid current collector 12, coupled to an electrical conductor 13 suitable for being connected to the opposite pole of the external rectifier, consists of a planar surface provided with openings, such as for instance a punched sheet, an expanded sheet or a mesh of interlaced wires. Flexible electrode 10 is formed by a thin surface provided with openings, such as for instance a punched or expanded sheet or a wire mesh. Finally, current collector 11 consists of a layer of suitable thickness formed by interlaced or interwoven metal wires which in a partially compressed state presents a sufficient elasticity to ensure the electrical continuity and a uniform distribution of electric current along the whole surface of current collector 12 and electrode 10, even when the surfaces of current collector 12 and separator 14 supported by electrode 8 deviate substantially from an ideal parallelism, due to mechanical tolerances inevitably present in industrially manufactured cells.

Shell 5 is further provided with nozzles 7 and 6, respectively for feeding the solution to be electrolysed and for extracting the exhaust electrolytic solution mixed with the optional gases formed on electrode 10.

An application of particular relevance of the cell of FIG. 1 is represented by its use in chlor-alkali processes, more specifically in sodium chloride brine electrolysis with production of chlorine and caustic soda, whereto reference will be made in the following for the sake of simplicity, although it is intended that the scope of the invention encompasses all kinds of electrolysis processes making use of cells subdivided by a separator, for instance in form of diaphragm or membrane. In the case of membrane cells used for chlor-alkali electrolysis, shell 2, commonly made of titanium, delimits the anodic compartment with the two nozzles respectively directed to feeding a concentrated sodium chloride solution and to discharge the depleted solution and chlorine evolved during operation on electrode 8, which acts as the anode and can be made of titanium coated with an electrocatalytic film for chlorine evolution based on platinum group metal oxides. Shell 5 is commonly made of nickel and delimits the cathodic compartment whose nozzles are employed for feeding diluted caustic soda and for discharging concentrated caustic soda mixed with hydrogen produced on electrode 10, which works as cathode. The cathode and current collector 12 are normally made of nickel, the current collector being obtained by interlacing or weaving nickel wires. Additionally, the cathode is preferably provided with an electrocatalytic coating for hydrogen evolution based on platinum group metals or oxides thereof.

The elastic collector can be viewed as the most critical component of the electrodic package, due to some partially conflicting requirements, in particular:

homogeneous pressure distribution both on the surface of the flexible electrode contacting the membrane and on the one of the rigid current collector to allow a uniform distribution of electric current on the flexible electrode-membrane assembly pressure exerted on the flexible electrode and the rigid current collector sufficient to minimise the contact electrical resistance, as necessary for obtaining low operative cell voltages at high current density, but on the other hand not as high as causing damage to membrane 14. Practical experience indicates that the pressure value capable of giving a satisfactory behaviour during operation is usually comprised between 50 and 300 g/cm$^2$, in one embodiment between 100 and 200 g/cm$^2$ mesh formed by interlaced or interwoven wires sufficiently open to allow an easy releases of gases evolved on electrode 10 and an efficient electrolyte renewal diameter of the interlaced or interwoven wires above a minimum threshold value in order to guarantee preservation of a substantial fraction of the original elasticity after opening the cell during maintenance interventions, but at the same time below a second threshold value beyond which pressure levels would be dangerous for membrane integrity.

Of the above conditions, the former two, which are of particular importance for a prolonged trouble-free cell operation, can be achieved only when the elastic collector presents a rather reduced value of the angular coefficient of the pressure to compression (or pressure to thickness) relationship.

Figure 2:
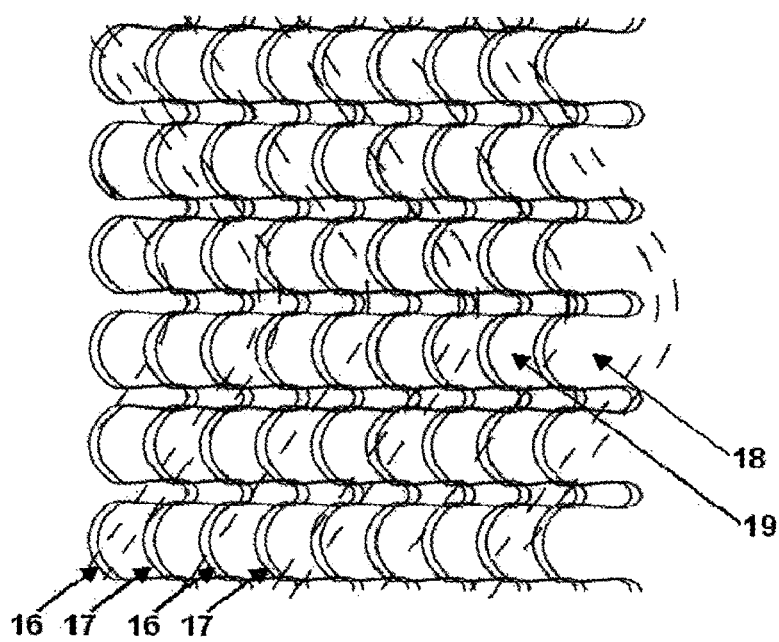
FIG. 2 is a top three-dimensional view of a component of the current collector according to one embodiment.

It was surprisingly observed that the above indicated conditions, all necessary to guarantee an optimum functioning of electrolysis cells of the type illustrated in FIG. 1, are simultaneously satisfied when elastic collector 11 comprises a layer produced by interlacing or weaving of a multiplicity of first sets of metal wires, optionally first pairs of metal wires, with a multiplicity of single wires or with a multiplicity of second sets of metal wires, optionally second pairs of metal wires, forming a planar cloth or, in one embodiment, a stocking which is subsequently flattened to form a planar cloth-like structure. The layer is then corrugated by applying a pressure with a suitable mechanical tool so as to produce corrugations, optionally disposed in a herringbone pattern. FIG. 2 illustrates a top-view in three dimensions of an embodiment of layer obtained by interlacing a multiplicity of first pairs of nickel wires, only two of which are indicated as 16 for simplicity of illustration, with a multiplicity of second pairs of nickel wires, only two of which are indicated as 17.

Reference numerals 18 and 19 are used to indicate two of the corrugations shown as the dotted lines. The corrugated layer is subsequently coupled to a planar cloth or stocking obtained by interlacing or weaving single wires (not shown in FIG. 2): in the specific case of a stocking, the latter can be flattened out to form a planar cloth-like structure. In another embodiment, the corrugated layer is inserted in the interior of the stocking with formation of an overall generally planar structure. The stocking of the elastic layer and the stocking to be coupled to the layer as above illustrated can have the advantage, versus a simple cloth, of being made by an interlacement or continuous weaving of wires presenting no free apexes that might damage the membrane. The coupling of the corrugated layer with the planar cloth or stocking has the purpose of increasing the amount of points of contact between corrugated layer and flexible cathode or rigid current distributor, respectively, with the aim of achieving a homogeneous pressure distribution also on a local scale and minimising the overall electrical resistance, thereby obtaining a lower cell voltage and electrical energy consumption. When the current collector as defined is installed in a cell of the type sketched in FIG. 1, the planar cloth or stocking is inserted between corrugated layer and flexible cathode or, in another embodiment, between corrugated layer and current distributor. In one embodiment, the corrugated layer is introduced inside the stocking whose two planar surfaces therefore end up being respectively enclosed between corrugated layer and flexible cathode and between corrugated layer and current distributor.

Figure 3:
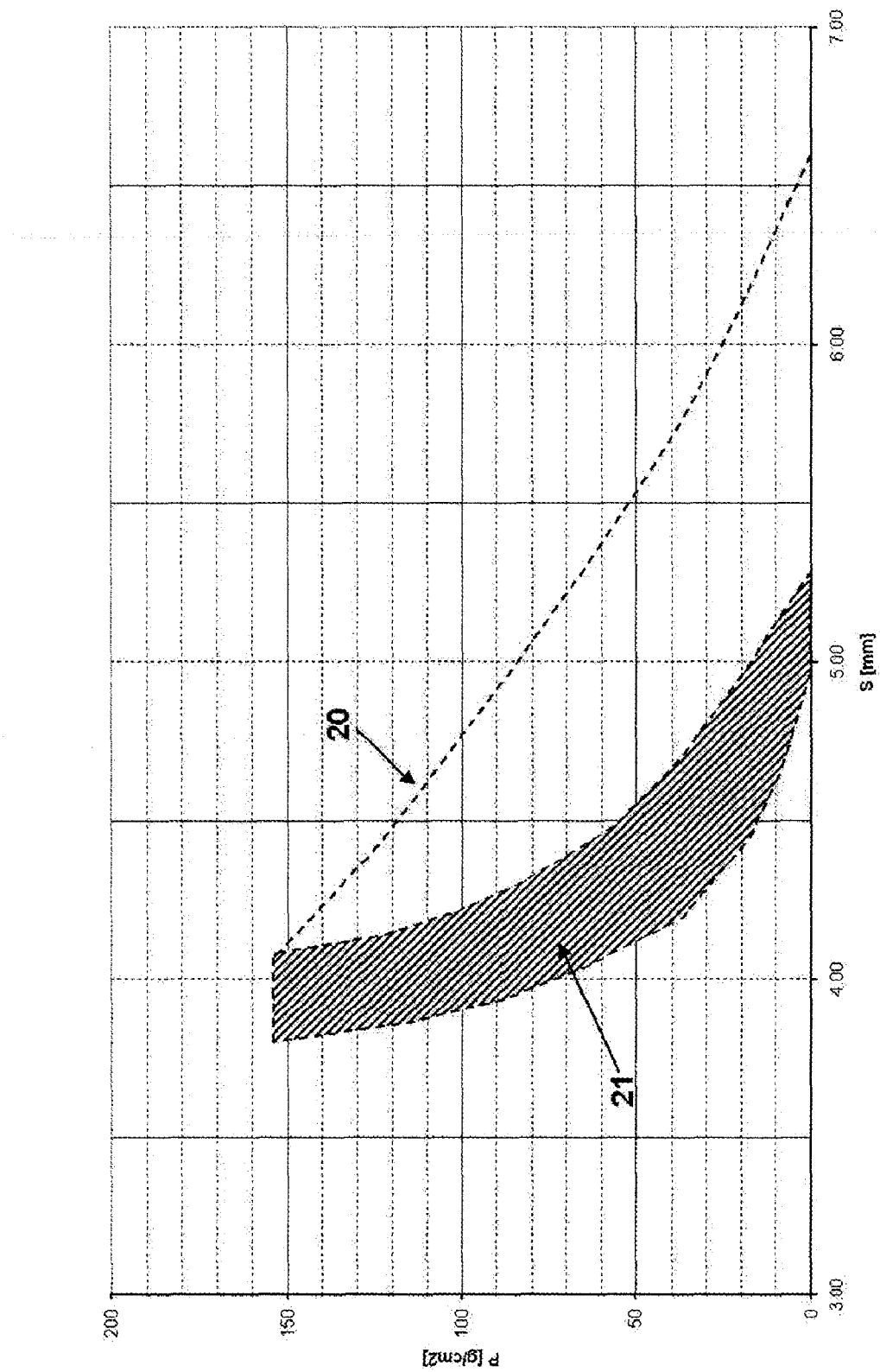
FIG. 3 shows the applied pressure to thickness relationship relative to one embodiment of current collector obtained by coupling the component of FIG. 2 with a planar stocking formed by weaving of a single wire.

An optimum functioning of the cell comprising the elastic collector as defined can be achieved to a satisfying extent especially when the following conditions are met:

diameter of nickel wire in the corrugated layer of 0.08 to 0.30 mm, preferably 0.12 to 0.20 mm corrugated layer obtained by interlacing or weaving of multiplicities of first and second sets of wires according to a generally quadrangular mesh of sides independently comprised between 4 and 8 mm distance from the wires of each individual set of the corrugated layer not higher than 2 mm corrugation pitch of the corrugated layer of 2 to 20 mm, optionally 5 to 15 mm thickness of the corrugated layer in the uncompressed condition of 2 to 15 mm, optionally 5 to 10 mm thickness of the corrugated layer in the compressed condition of 1 to 10 mm, optionally 2 to 6 mm diameter of the nickel wire in the additional planar cloth or stocking of 0.08 to 0.30 mm planar cloth or stocking of generally quadrangular mesh of sides independently comprised between 2 and 6 mm pressure to thickness ratio characterised by an angular coefficient lower than 300 g/cm$^2$·mm The pressure to thickness relationship of one embodiment of elastic collector is illustrated in FIG. 3. In particular, this elastic collector comprises a corrugated layer obtained by interlacing of two multiplicities of first and second pairs of nickel wires having a diameter of 0.16 mm, and characterised by a generally quadrangular mesh having sides of 6 mm, no distance between wires of each pair, corrugation of 10 mm pitch and initial uncompressed thickness of 6.5 mm; additionally, the collector further comprises a stocking, flattened in a planar cloth-like structure and obtained by weaving of a 0.16 mm diameter nickel wire in a generally quadrangular mesh of 5 mm sides. As can be noticed from FIG. 3, after an initial compression indicated as 20 the collector has a reproducible elastic behaviour identified as 21 characterised by a pressure of 50 to 150 g/cm$^2$ in correspondence of thickness values of 4.5 to 3.8 mm, with an angular coefficient of just 200 g/cm$^2$·mm. The immediate consequence of this situation is that even in the surface portions of the current distributor and of the rigid anode having maximum deviation from parallelism due to an unfavourable combination of constructive mechanical tolerances, the pressure exerted by the current collector on the current distributor and the cathode and thus on the membrane always remains within the optimum range: hence, a prolonged operation with no damage to the membranes and with a minimised contact ohmic resistance between collector and current distributor and cathode is ensured, allowing to obtain particularly low cell voltage and energy consumption.

Figure 4:
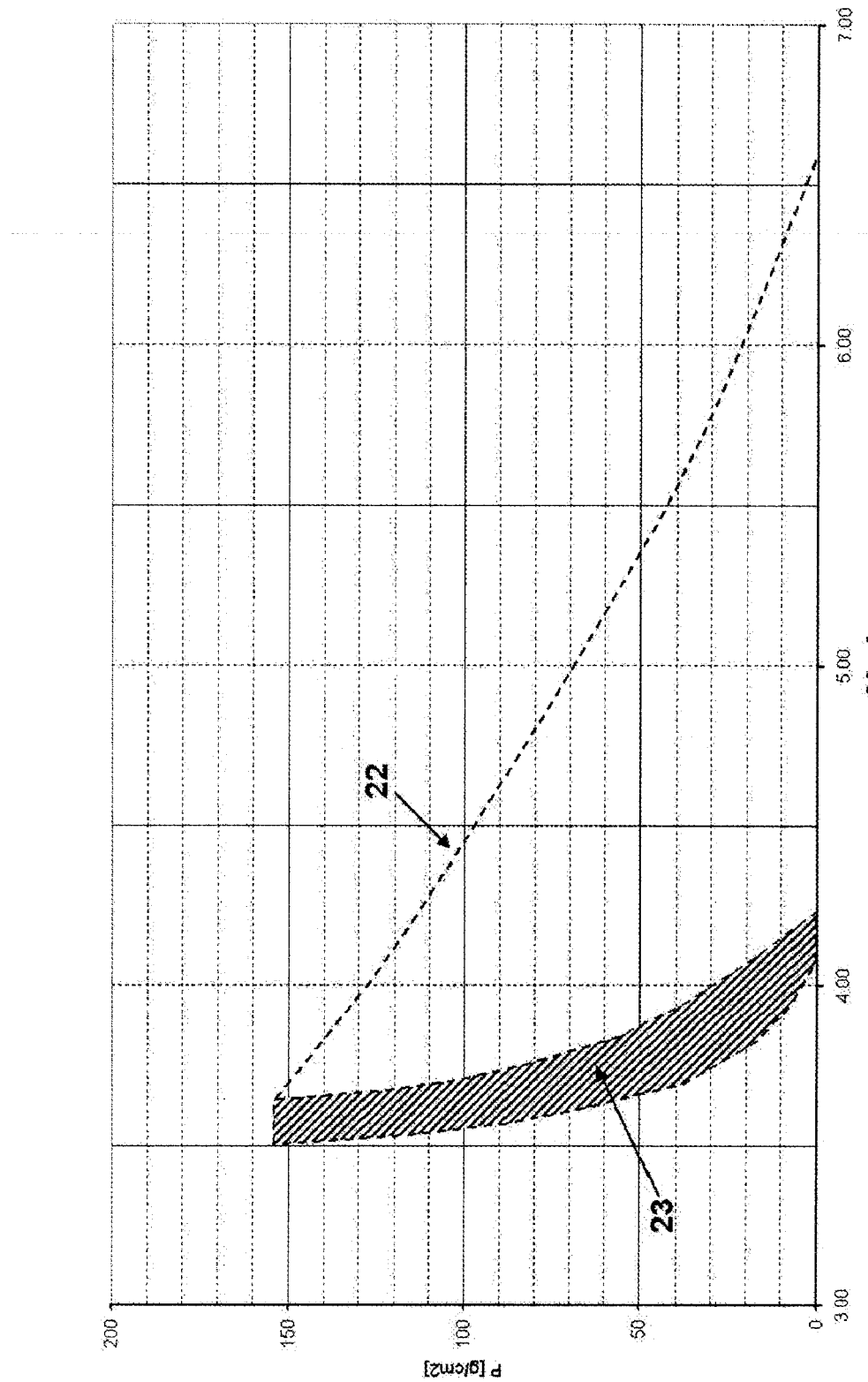
FIG. 4 shows the applied pressure to thickness relationship relative to a collector of the prior art obtained by corrugation of a cloth produced by weaving of single wires.

The comparison between the behaviour of the illustrated collector and the behaviour of collectors of the prior art is exemplified in FIG. 4 which illustrates the pressure-to-thickness relationship of a collector manufactured in accordance with U.S. Pat. No. 4,444,632: the collector has an uncompressed initial thickness of 6.5 cm and consists of two juxtaposed corrugated layers, each layer being obtained by weaving of a single nickel wire having a diameter of 0.16 mm forming a generally quadrangular mesh having sides of 6 mm, with the corrugations arranged with a 10 mm pitch. The analysis of the relationship of FIG. 4, wherein 22 and 23 respectively identify the initial compression and the region of reproducible elastic behaviour, indicates that the angular coefficient has a value as high as 400 g/cm$^2$·mm: as a consequence, the thickness variation of the collector caused by the deviation from parallelism of rigid electrode and rigid current distributor can lead to pressures exceeding 150 g/cm$^2$ with an increased risk of damaging the membrane, or lower than 50 g/cm$^2$ with a likely increase of the electrical contact resistance between collector and rigid distributor and between collector and cathode, with consequent increase in the cell voltage and in the electrical energy consumption.

The current collector of the present invention can also be easily installed in the cell, since it consists of a single element (single corrugated layer or corrugated layer enclosed inside a stocking) or two components at most (corrugated layer coupled to a single cloth or flattened stocking). In cells of the prior art, the use of collectors consisting of a plurality of individual corrugated layers obtained by interlacing or weaving of single wires was often described: similar kinds of layers are characterised by a modest mechanical stability and a consequent difficulty of assembling in the cell.

The previous description is not intended to limit the invention, which may be used according to different embodiments without departing from the scopes thereof, and whose extent is univocally defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. A current collector for working in a partially compressed condition in a diaphragm or membrane electrochemical cell, comprising at least one layer obtained by interlacing or weaving of a multiplicity of first sets of metal wires with a multiplicity of single metal wires or of second sets of metal wires and provided with generally parallel corrugations, wherein said layer provided with corrugations has a further planar cloth or flattened stocking obtained by interlacing or weaving of single metal wires juxtaposed thereto.

2. The collector of claim 1, wherein said multiplicity of first sets of metal wires and of single metal wires or of second sets of metal wires comprise wires having a diameter of 0.08 to 0.30 mm.

3. The collector of claim 2, wherein said multiplicity of first sets of metal wires and of single metal wires or of second sets of metal wires comprise wires having a diameter of 0.12 to 0.2 mm.

4. The collector of claim 1, wherein the distance between the wires of each individual set is not higher than 2 mm.

5. The collector of claim 1 wherein said multiplicity of first sets of metal wires and said multiplicity of single wires or of second sets of metal wires are arranged in generally quandrangual meshes.

6. The collector of claim 5, wherein the sides of said generally quadrangular meshes are independently comprises between 4 and 8 mm.

7. The collector of claim 1, wherein said first and second sets of metal wires consist of pairs of metal wires.

8. The collector of claim 1 wherein said corrugations are arranged in a herringbone pattern.

9. The collector of claim 1 wherein said corrugations have a pitch of 2 to 20 mm.

10. The collector of claim 9, wherein said corrugations have a pitch of 5 to 15 mm.

11. The collector of claim 1, wherein said layer provided with corrugations has an uncompressed thickness of 2 to 15 mm.

12. The collector of claim 11, wherein said layer provided with corrugations has an uncompressed thickness of 5 to 10 mm.

13. The collector of claim 1, wherein said layer provided with corrugations has a thickness of 1 to 10 mm in a partially compressed state corresponding to a working condition.

14. The collector of claim 13, wherein said layer provided with corrugations has a thickness of 2 to 6 mm in a partially compressed state corresponding to a working condition.

15. The collector of claim 1, wherein said layer provided with corrugations is inserted inside a stocking obtained by interlacing or weaving of single metal wires.

16. The collector of claim 1, wherein said single wires of said further planar cloth or of said stocking have a diameter of 0.1 to 0.5 mm.

17. The collector of claim 1, wherein said interlacing or weaving of said stocking comprises generally quadrangular meshes.

18. The current collector of claim 17, wherein said generally quadrangular meshes have sides independently comprised between 2 and 6 mm.

19. The collector of claim 1 having a pressure-thickness relationship with an angular coefficient lower than 300 g/cm$^2$ mm.

* * * * *

UNITED STATES PATENT AND TRADEMARK OFFICE
CERTIFICATE OF CORRECTION

PATENT NO.        : 8,372,255 B2                              Page 1 of 1
APPLICATION NO.   : 12/452107
DATED             : February 12, 2013
INVENTOR(S)       : Perego et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 438 days.

Signed and Sealed this
First Day of September, 2015

Michelle K. Lee
*Director of the United States Patent and Trademark Office*